US010114675B2

(12) United States Patent
Ding et al.

(10) Patent No.: US 10,114,675 B2
(45) Date of Patent: Oct. 30, 2018

(54) APPARATUS AND METHOD OF MANAGING SHARED RESOURCES IN ACHIEVING IO VIRTUALIZATION IN A STORAGE DEVICE

(71) Applicant: Toshiba Memory Corporation, Tokyo (JP)

(72) Inventors: Zhimin Ding, Sunnyvale, CA (US); Dishi Lai, San Jose, CA (US); Naoyuki Kai, San Jose, CA (US)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 14/675,235

(22) Filed: Mar. 31, 2015

(65) Prior Publication Data

US 2016/0292007 A1    Oct. 6, 2016

(51) Int. Cl.
  *G06F 9/50* (2006.01)
  *G06F 9/48* (2006.01)
  *G06F 9/455* (2018.01)

(52) U.S. Cl.
  CPC ........ *G06F 9/5011* (2013.01); *G06F 9/45533* (2013.01); *G06F 9/4881* (2013.01); *G06F 2009/45579* (2013.01)

(58) Field of Classification Search
  CPC .................................................... G06F 9/5011
  See application file for complete search history.

(56) References Cited

U.S. PATENT DOCUMENTS

| 7,613,847 B2 | 11/2009 | Kjos et al. | |
| 8,141,094 B2 | 3/2012 | Brown et al. | |
| 2009/0083743 A1 | 3/2009 | Hooper et al. | |
| 2011/0258352 A1 | 10/2011 | Williams et al. | |
| 2012/0102490 A1* | 4/2012 | Eide | G06F 9/45558 718/1 |
| 2013/0174144 A1* | 7/2013 | Cheng | G06F 9/45558 718/1 |
| 2013/0326106 A1* | 12/2013 | Ward | G06F 13/385 710/306 |
| 2014/0108584 A1 | 4/2014 | Lu | |
| 2015/0201017 A1* | 7/2015 | Hrischuk | H04L 67/1097 709/226 |
| 2016/0077884 A1* | 3/2016 | Hunter | G06F 9/5077 718/104 |

OTHER PUBLICATIONS

Joanna Klukowska, Lectur Notes, 2014.*

* cited by examiner

*Primary Examiner* — Charlie Sun
(74) *Attorney, Agent, or Firm* — Patterson & Sheridan, LLP

(57) ABSTRACT

A technique for sharing resources in a data storage device. The data storage device receives a command associated with a non-volatile semiconductor memory device from a host system, the command including a virtual function identifier and a transaction identifier. The data storage device identifies, via a virtual function mapping unit that is included within a controller and that maintains a function mapping table which stores programmable values that associate virtual functions with portions of shared resources of the controller, a portion of a shared resource of the controller based on the virtual function identifier and the transaction identifier. The data storage device accesses the identified portion of the shared resource based on the received command.

20 Claims, 5 Drawing Sheets

APPARATUS AND METHOD OF MANAGING SHARED RESOURCES IN ACHIEVING IO VIRTUALIZATION IN A STORAGE DEVICE

BACKGROUND

Solid-state drives (SSDs) generally have faster performance, are more compact, and are less sensitive to vibration or physical shock than conventional magnetic disk drives. Given these advantages, SSDs are being used in more and more computing devices and other consumer products in lieu of or in addition to magnetic disk drives, even though the cost-per-gigabyte storage capacity of SSDs is significantly higher than that of magnetic disk drives.

Peripheral Component Interconnect Express ("PCIe") is a standard that specifies the architecture of a communication fabric, and associated protocols, for communication between peripheral devices and the central processing unit ("CPU") within a computer system. Devices connected to the PCIe fabric direct communications to other devices by providing a PCIe address. The fabric routes such communications to the appropriate device based on this address.

One portion of the address is a device number that specifies the physical device to which a communication is to be routed. Another portion of the address is a function number that specifies the "function" within the specified device to which the communication is directed. The functionality that is associated with any particular function is defined by each individual peripheral device.

Recent modifications to the PCIe specification have introduced the concept of virtual functions (as opposed to physical functions). Virtual functions represent an additional addressing parameter by which a CPU may specify a subdivision of functionality within a peripheral device. More specifically, each physical function may be associated with a set of virtual functions. The virtual functions associated with any particular physical function can be thought of as "clones" in that virtual functions are essentially multiple parallel channels that each provides access to functionality of a single physical function.

Virtual functions are typically used by a host system in which multiple virtual machines that each comprises a software emulation of a physical computer, are running. For any particular physical function, each virtual function is assigned to a different virtual machine. This assignment allows each virtual machine to independently address the peripheral device.

Peripheral devices, such as SSDs, include a number of different types of internal resources, such as queues, buffers, registers, and the like. Typically, these resources are divided between virtual functions in a fixed manner. More specifically, each virtual function is assigned a specific, fixed portion of each resource.

One issue with assigning resources to virtual functions in a fixed manner is that the specific assignment of resources to virtual functions is not necessarily in line with the manner in which a particular computer system utilizes the peripheral device. For example, a peripheral device may support eight virtual functions and thus divide internal resources into eight separate "chunks." However, a computer system may only execute four virtual machines. Because those virtual machines would only use four virtual functions, resources assigned to other non-used virtual functions would be wasted.

SUMMARY

A data storage device is provided herein. The data storage device includes a non-volatile semiconductor memory device and a controller including a virtual function mapping unit that maintains a function mapping table which stores programmable values that associate virtual functions with portions of shared resources of the controller. The controller is configured to receive a command associated with the non-volatile semiconductor memory device from a host system, the command including a virtual function identifier and a transaction identifier. The controller is also configured to identify, via the virtual function mapping unit, a portion of a shared resource of the controller based on the virtual function identifier and the transaction identifier. The controller is further configured to access the identified portion of the shared resource based on the received command.

A method is also provided herein. The method includes receiving a command associated with a non-volatile semiconductor memory device from a host system, the command including a virtual function identifier and a transaction identifier. The method also includes identifying, via a virtual function mapping unit that is included within a controller and that maintains a function mapping table which stores programmable values that associate virtual functions with portions of shared resources of the controller, a portion of a shared resource of the controller based on the virtual function identifier and the transaction identifier. The method further includes accessing the identified portion of the shared resource based on the received command.

A non-transitory computer-readable medium storing instructions that, when executed by a process, cause the processor to perform a method is also provided herein. The method includes receiving a command associated with a non-volatile semiconductor memory device from a host system, the command including a virtual function identifier and a transaction identifier. The method also includes identifying, via a virtual function mapping unit that is included within a controller and that maintains a function mapping table which stores programmable values that associate virtual functions with portions of shared resources of the controller, a portion of a shared resource of the controller based on the virtual function identifier and the transaction identifier. The method further includes accessing the identified portion of the shared resource based on the received command.

DETAILED DESCRIPTION

Figure 1:
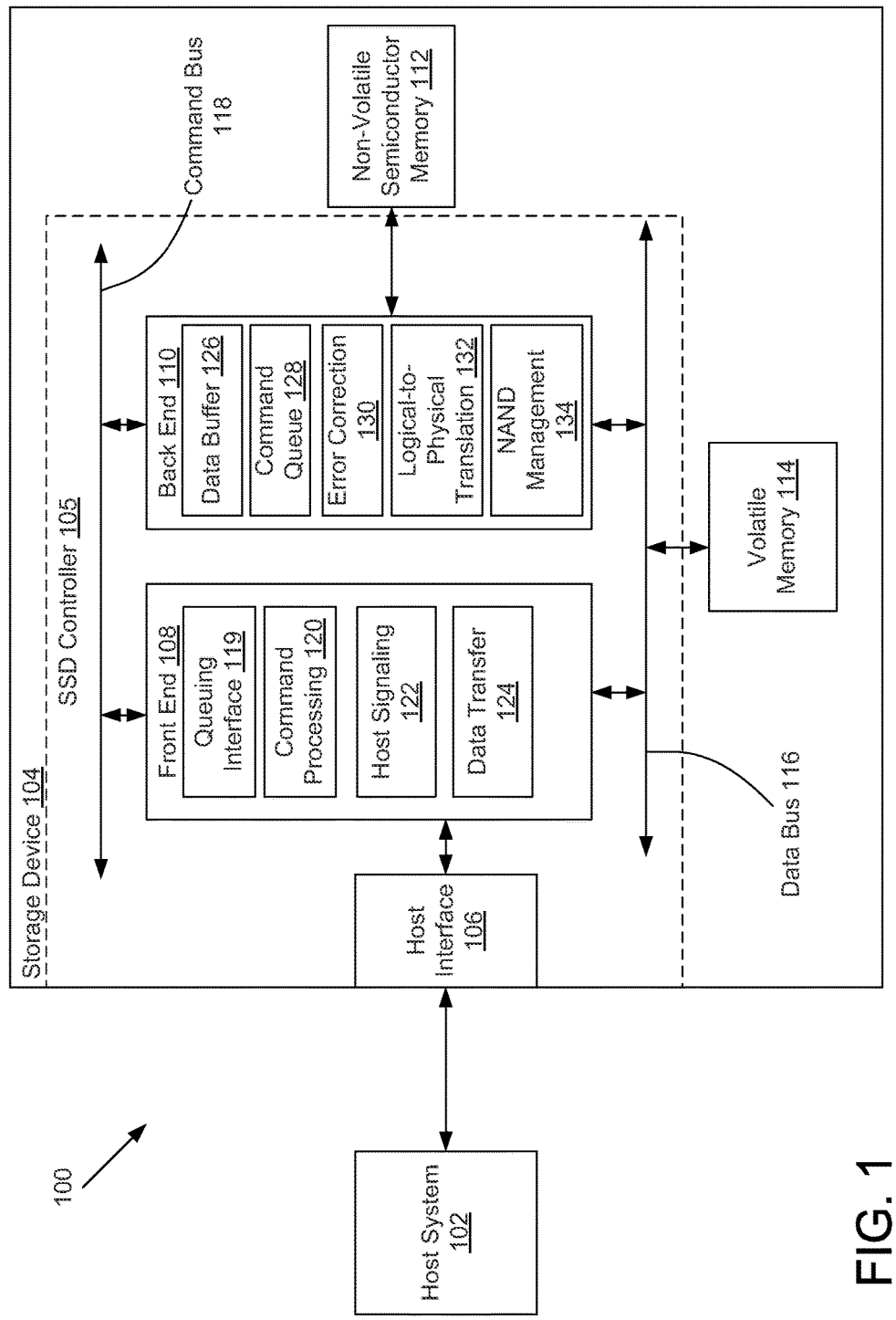
FIG. 1 is a block diagram of a solid-state drive (SSD), configured according to one or more embodiments.

FIG. 1 is a block diagram of a computing system 100 including a storage device 104 in communication with a host system 102. Host system 102 is a computing system that comprises processors, memory, and other components as is generally known. Storage device 104 provides non-volatile storage functionality for use by host system 102. Storage device 104 is a solid-state drive ("SSD"), which is a non-volatile storage device that includes non-volatile semiconductor-based storage elements, such as NAND-based flash memory, as the storage medium (as opposed to, for example, the magnetic medium used in hard disk drives).

Storage device 104 includes an SSD controller 105, volatile memory 114, and non-volatile semiconductor memory 112. Storage device 104 may also include other elements not shown, such as power supply circuitry (including circuitry for transferring power to the SSD controller 105, volatile memory 114, and non-volatile semiconductor memory 112 as well as capacitors for buffering the power supply), indicator light circuitry, temperature sensors, boot circuitry, clock circuitry, and other circuitry for assisting with various functions.

SSD controller 105 receives and processes commands from host system 102 in order to perform operations on the non-volatile semiconductor memory 112. Commands from host system 102 include requests to read or write to locations within the non-volatile semiconductor memory 112, and various administrative commands, such as commands for querying the feature set of storage device 104, commands for formatting non-volatile memory 112, commands for creating and modifying various types of queues, commands for requesting notification of various events, and various other commands. SSD controller 105 includes a host interface 106, a front end 108, a back end 110, a command bus 118, and a data bus 116.

Host interface 106 comprises circuitry for communicating with host system 102. In one embodiment, the interface with which host system 102 communicates with host interface 106 is a peripheral component interconnect express ("PCIe") interface that communicates according to the PCIe standard. In another embodiment, the interface is a serial advanced technology attachment (SATA) interface.

Front end 108 communicates with host system 102 to receive, organize, and forward commands and data from host system 102 to back end 110, and communicates with back end 110 to forward data from back end 110 to host system 102. Back end 110 performs tasks associated with commands received from front end 108, accessing non-volatile semiconductor memory 112 as needed in accordance with these tasks.

Both front end 108 and back end 110 are coupled to a command bus 118 and a data bus 116. Command bus 118 functions to transfer command-related data between various sub-units of front end 108 and back end 110, and data bus 116 serves to transfer data that is read from non-volatile semiconductor memory 112 ("read data") and data that is written to non-volatile semiconductor memory 112 ("write data") between various sub-units of front end 108 and back end 110. Data bus 116 is also coupled to volatile memory 114. Thus, both front end 108 and back end 110 can access volatile memory 114.

Non-volatile semiconductor memory 112 stores data in a non-volatile manner at the request of host system 102. Non-volatile semiconductor memory 112 includes one or more arrays of non-volatile semiconductor-based storage elements, some examples of which include non-volatile NAND flash memory, non-volatile NOR flash memory, non-volatile DRAM based memory, magnetoresistive random-access memory (MRAM), and other types of memory. As NAND-based flash memory is commonly used as the non-volatile semiconductor memory 112, non-volatile semiconductor memory 112 may be referred to herein as NAND memory 112 or simply as NAND 112.

Front end 108 includes multiple functional units, including queuing interface 119, command processing unit 120, host signaling unit 122, and data transfer unit 124. Queuing interface 119 communicates with host system 102 about the status of commands stored in submission queues and completion queues stored in memory within host system 102. Submission queues store commands to be fetched by SSD controller 105 and completion queues store information about commands completed by SSD controller 105. Command processing unit 120 forwards received commands to back end 110 for processing. Command processing unit 120 may also include a command arbitrator that selects one or more commands to forward to back end 110 for processing based on an arbitration schedule or technique.

Host signaling unit 122 generates host notification signals and transmits these signals to host system 102. These signals may be used to indicate that one or more commands submitted by host system 102 are complete. Host notification signals include interrupts and may be out-of-band, pin-based interrupts, or may be in-band message signaled interrupts ("MSI" or "MSIx"). The interrupts include data identifying the command that has been completed as well as status data associated with that command. Host signaling unit 122 includes an interrupt table that includes such information, as well as an interrupt generator which generates interrupts for transmission to host system 102, based on the information stored in the interrupt table.

Data transfer unit 124 serves as an intermediary between host interface 106 and back end 110. Data transfer unit 124 directs data received from host interface 106 to be stored in volatile memory 114 for later retrieval at the direction of back end 110. Data transfer unit also directs data stored in volatile memory 114 at the direction of back end for later transmission to host system 102 via host interface 106.

Back end 110 includes multiple functional units, including a data buffer 126, a command queue 128, an error correction unit 130, a logical-to-physical address translation unit 132, and a NAND management unit 134. Data buffer 126 configures a read cache and a write cache in volatile memory 114. A read cache temporarily stores data read from non-volatile semiconductor memory 112 in response to a command from host system 102, for transmission by front end 108 to host system 102 through host interface 106. A write cache temporarily stores data received from host system 102 and transmitted by front end 108, to be written to non-volatile semiconductor memory 112.

Command queue 128 stores commands received from front end 108 for further processing. Buffering commands in this manner allows back end 110 to process received commands based on a particular schedule or on specific timing or state-based constraints.

Error correction unit 130 provides error correction functionality for data stored in non-volatile semiconductor memory 112. Error correction unit 130 generates error-correction data for data written to the non-volatile semiconductor memory 112 and stores the error-correction data with the written data. When the written data is read out and error in reading is encountered, error correction unit 130 performs error correction operations using the error-correction data.

Logical-to-physical translation unit 132 translates logical addresses, e.g., logical block addresses (LBAs), to physical addresses, e.g., physical block addresses, of non-volatile semiconductor memory 112 during reading or writing data. Logical-to-physical translation unit 132 accesses a map, known as a flash translation layer (FTL), when converting logical addresses to physical addresses so that data requested by host system 102 with a logical address can be properly physically addressed within non-volatile semiconductor memory 112.

NAND management unit 134 may provide wear leveling, bad block mapping, garbage collection, and read scrubbing.

Wear leveling is a technique to compensate for the fact that a (relatively) limited number of write operations can be performed on each NAND data storage element, commonly referred to as a block. Wear leveling comprises periodically moving data between NAND data storage blocks in order to even out or "level" the number of times write operations are performed for each data storage block. Bad block mapping is a technique for marking blocks as being "bad" after it is discovered that such blocks are unreliable. Blocks marked as bad are not written to or read from.

Garbage collection is a technique whereby valid pages (a subunit of a block) within a block are copied to a new block so that the source block can be erased. Garbage collection is needed in NAND memory because the unit of writing is a page and the unit of erasure is a block. Accordingly, if a command to write data targets an existing page, then the data of the existing page is not actually modified. Instead, a new page is written and the old page is marked as invalid. As a result, the number of invalid pages continues to grow and garbage collection becomes necessary to free up blocks having a large number of invalid pages.

Read scrubbing is a technique whereby SSD controller 105 periodically reads data in the non-volatile semiconductor memory 112, performs error checking operations on the data to determine if there are errors, corrects errors that are found, and then writes the error-corrected data back to the same location. This technique helps to reduce the amount of errors experienced when reading data out from the non-volatile semiconductor memory 112.

In various embodiments, the functional blocks included in front end 108 and back end 110 represent hardware or combined software and hardware elements for performing associated functionality. Thus, any or all of the functional blocks may be embodied as firmware executing in a processing unit, as hardware units that are hard-wired to perform the associated functionality, or as a combination thereof. For example, either or both of front end 108 or back end 110 may include one or more processors, one or more state machines, one or more application specific integrated circuits (ASICs), or the like, that are programmed or configured to perform functions related to the functional blocks. Alternatively, a single processor may be shared between and thus may perform the functions of both front end 108 and back end 110.

Certain functional blocks and functionality associated therewith that are depicted as being included within front end 108 or back end 110 may be implemented as data structures stored within volatile memory 114. Thus, for example, queues indicated as being included in front end 108 and back end 110, may be stored within volatile memory 114.

For purposes of illustration, both an example read operation and an example write operation are now described. To write data to NAND 112, host system 102 provides a write command, write data, and a logical address to front end 108 via host interface 106. Command processing unit 120 of front end 108 receives this command and forwards the command to command queue 128 of back end 110 for processing. Data transfer unit 124 of front end 108 forwards the data to the write cache of back end 110 configured in volatile memory 114. Logical-to-physical translation unit 132 converts the logical address received to a physical address. NAND management unit 134 performs any associated techniques on NAND 112, such as generating error-correction data and back end 110 writes the specified data to NAND 112. After this command is complete, back end 110 signals front end 108, which generates a completion signal (such as an interrupt) and transmits that signal to host system 102, indicating that the write command has been completed.

To read data from NAND 112, host system 102 provides a read command and a logical address to front end 108 via host interface 106. Command processing unit 120 of front end 108 receives this command and forwards the command to command queue 128 of back end 110 for processing. Logical-to-physical translation unit 132 translates the logical address to a physical address and provides the physical address to NAND 112 for reading. NAND 112 returns the requested data. Error correction 130 performs error correcting operations on the data. Back end 110 stores the data in the read cache configured in volatile memory 114 and indicates to front end 108 that the command is complete. Host signaling unit 122 generates a completion signal and transmits that signal to the host system 102, along with the data read from NAND 112.

Sharing Resources Between Virtual Functions

Various resources within SSD controller 105, such as, without limitation, memories, queues, buffers, and processing units, may be shared between multiple virtual functions. In contrast with prior art SSDs, however, SSD controller 105 provides a mechanism whereby host system 102 may configure the manner in which the resources are shared between virtual functions. More specifically, host system 102 may transmit a command to SSD controller 105 to cause SSD controller 105 to change the amount of resources that are assigned to the different virtual functions. The figures below illustrate this concept in more detail.

Figure 2:
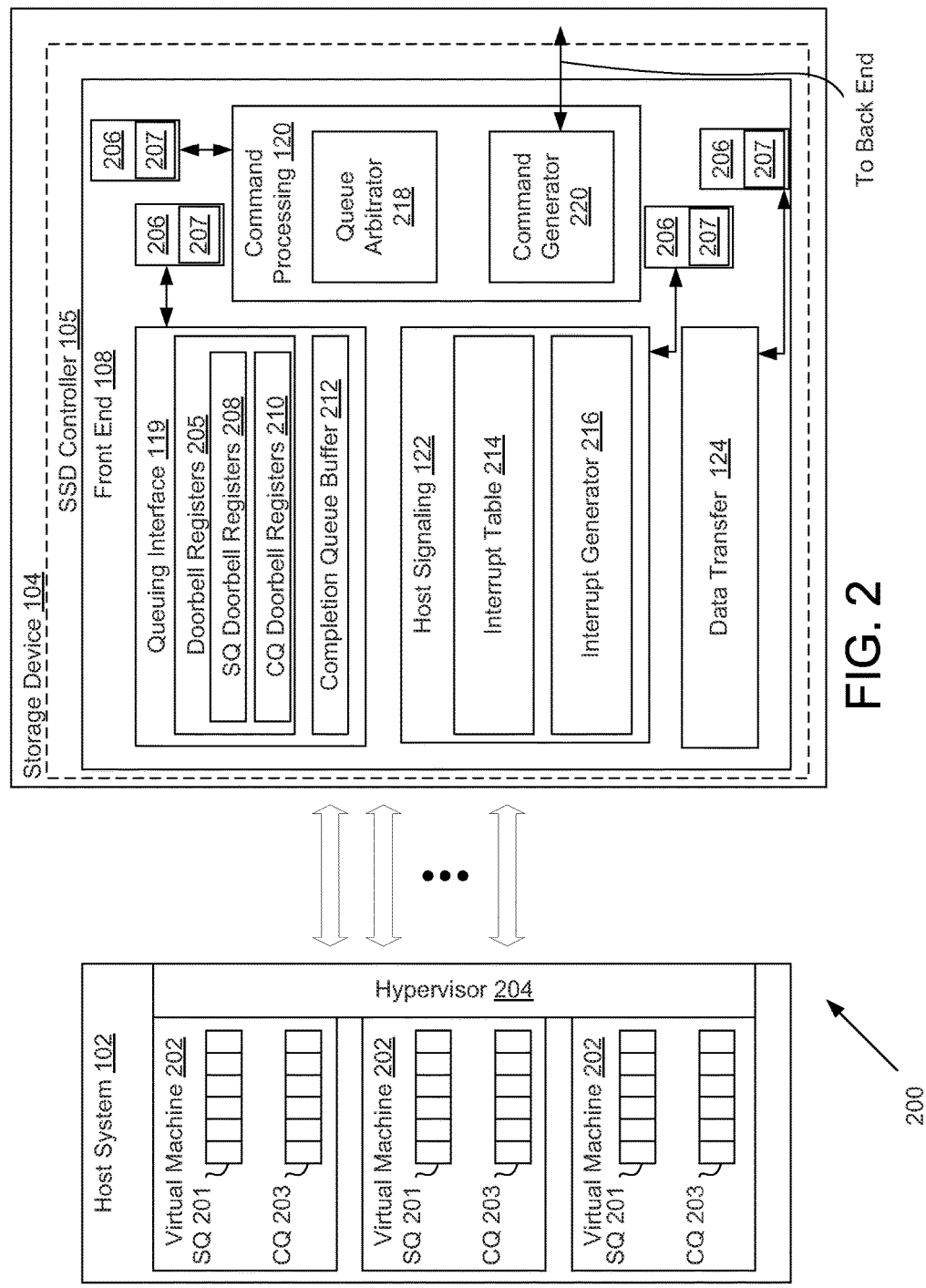
FIG. 2 is a block diagram of the host system and storage device of FIG. 1, illustrating examples of resources within the SSD controller that may be shared between virtual functions.

FIG. 2 is a block diagram of the host system 102 and storage device 104 of FIG. 1, illustrating examples of resources within the SSD controller 105 that may be shared between virtual functions. In addition to the example resources, which are located within front end 108 of SSD controller 105, FIG. 2 also illustrates details of the host system 102, including virtual machines 202 and a hypervisor 204. In the example given herein, virtual machines 202 each specify a different virtual function when issuing commands to SSD controller 105.

Within host computer system 102, hypervisor 204 manages multiple independent computer system emulations called virtual machines 202. Hypervisor 204 manages various functional aspects of virtual machines 202, including input/output operations (IOs). Hypervisor 204 assigns a different virtual function number to each different virtual machine 202. Hypervisor 204 may assign more than one virtual function number to a particular virtual machine 202 but does not assign the same virtual function number to multiple virtual machines 202. Thus, each virtual function number is uniquely assigned to one and only one virtual machine 202. When a virtual machine 202 generates a command to access storage device 104, hypervisor 204 transforms the command to include the virtual function number assigned to the virtual machine 202 and transmits the command and the virtual function number to storage device 104 for processing.

SSD controller 105 employs one or more virtual function mapping units 206 and corresponding sets of input/output virtualization registers 207 ("IOV registers") to define how resources are to be partitioned among the virtual functions.

In the embodiments, host system 102 is able to configure each virtual function mapping unit 206, via the associated IOV registers 207 to specify which virtual functions are active or inactive and to change the amount of resources allocated to the different virtual functions. The host configuration of the virtual function mapping units 206 via the associated IOV registers 207 may be performed using any of the techniques known in the art, including APIs exposed by SSD controller 105 or a set function command.

In some embodiments, the IOV registers 207 are implemented as D flip-flops. D-flip-flops are more easily and quickly accessed by a combinatorial logic portion of the virtual function mapping unit 206 in order to perform translation in real time. In addition, IOV registers 207 are wired in such a way that they can be programmed by host system 102 or firmware through a programming bus, which in some embodiments is an AXI ("advanced extensible interface") bus. The IOV registers 207 are assigned an address to facilitate access by host system 102 or an integrated CPU that executes firmware code and processes administrative commands.

A virtual machine 202 may query storage device 104 to determine the amount of resources assigned to virtual functions associated with that virtual machine 202. More specifically, at any time, a virtual machine 202 may transmit a query command to storage device 104, requesting information regarding the number of resources that are assigned to virtual functions associated with the virtual machine 202. In response, storage device transmits a message that indicates the number of each particular resource that is assigned to those virtual functions.

In some embodiments, host system 102 configures the number of virtual functions to be supported by storage device 104 in the following manner. During device enumeration, host system 102 reads information from storage device 104 that indicates the maximum number of virtual functions supported by the storage device 104. This information may be stored in a "Total VF" field of one or more IOV extended capability registers of the storage device 104. During enumeration, host system 102 also specifies the actual number of virtual functions that are to be supported by storage device 104, which storage device 140 stores in the IOV extended capability registers. At this point, firmware of storage device 104 is interrupted and calculates the number of resources that are to be allocated to the different virtual functions. This information, which may be referred to as the "resource pool arrangement," is stored in the storage device 104. Subsequently, host system 102 sends an administrative query command (such as an NVMe "Get Features" command) that specifies a virtual function to be queried. Firmware of the storage device 104 replies with the number of resources to be allocated to each virtual function. With this information, host system 102 sends another administrative query command (such as an NVMe "Set Features" command) that sets the actual number of resources for a particular virtual machine. This allows virtual functions to be allocated among virtual functions in an efficient manner.

Some example shared resources are depicted in FIG. 2 in order to illustrate examples of the types of resources within storage device 104 that may be shared between virtual functions. These resources are included within the queuing interface unit 119, host signaling unit 122, data transfer unit 124, and command processing unit 120 of front end 108, described above with respect to FIG. 1. More specifically, these resources include doorbell registers 205 (including submission queue ("SQ") doorbell registers 208 and completion queue ("CQ") doorbell registers 210) and a completion queue buffer 212 within queuing interface 119, an interrupt table 214 and interrupt generator 216, within host signaling unit 122, a queue arbitrator 218 and command generator 220 within command processing unit 120, and the data transfer unit 124. FIG. 2 also illustrates submission queues 201 and completion queues 203, included within virtual machines 202.

Briefly, submission queues 201 store command descriptors to be fetched by storage device 104. Completion queues 203 store command descriptors that are descriptive of commands that have been completed by storage device 104.

Doorbell registers 205 store descriptors of the head and tail of each submission queue 201 and completion queue 203, which provides knowledge of SQ 201 and CQ 203 without needing to store those queues in their entirety. Command processing unit 120 functions both to fetch commands from host system 102 and also to inform host system 102 when commands are completed.

Queue arbitrator 218 examines SQ doorbell registers 208 to request submission queue entries from host system 102. Command generator 220 generates commands for execution by back end 110, based on submission queue entries received from host system 102. Command generator 220 also generates command descriptors for commands that have been completed by back end 110, for writing into completion queues 203. When command generator 220 receives notification from back end 110 that a command is completed, command generator 220 stores a descriptor of the command in completion queue buffer 212, updates a CQ doorbell register 210, and provides an entry to the interrupt table 214 of the host signaling unit 122.

Interrupt generator 216 of host signaling unit 122 generates an interrupt and transmits the interrupt to host system 102, informing host system 102 of the completed command. Host system 102 retrieves the descriptor of the completed command from completion queue buffer 212 and places that descriptor into a completion queue 203. After processing the descriptor, host system 102 updates a CQ doorbell register 210 indicate that the command descriptor has been read.

Note that doorbell registers 205 include one head register and tail register for each submission queue 201 in host system 102 and one head register and tail register for each completion queue 203 in host system 102. Any particular virtual machine 202 may be associated with one or more submission queues 201 or completion queues 203. Thus, each virtual function may be associated with one or more than one set of these registers. Because the function mapping unit 206 is configurable, an administrator may configure which doorbell registers are assigned to which virtual function.

For illustrative purposes, an example operation is now described. In this example operation, a virtual machine 202 requests that a command be performed by storage device 104 by placing the command in a submission queue 201 and then "ringing a doorbell" by transmitting a doorbell registry entry to front end 108 for storage in SQ doorbell registers 208. More specifically, because the submission queue 201 is a queue, adding a command to a submission queue 201 updates the tail of the submission queue 201. As is generally known, a queue head represents the next element to be removed from the queue and a queue tail represents the last element to be removed from the queue. Upon updating the tail of the submission queue 201, virtual machine 202 updates a tail SQ doorbell register 208 to point to the new tail of that submission queue 201.

In order to process commands within submission queue 201, command processing unit 120 fetches commands from submission queue 201 via queuing interface 119. More specifically, to process commands in the submission queue 402, queue arbitrator 218, within command processing unit 120, accesses a submission queue head register within submission queue registers 208 to identify the entry in the corresponding submission queue 402 that is next to be read and requests one or more commands from the associated submission queue 201, within host system 102, based on this information. Host system 102 transmits these commands to storage device 104 and command generator 220 generates commands for back end 110 based on the commands received from host system 102. Also, upon reading the commands from submission queue 201 in host system 102, queuing interface 119 updates the head register for the submission queue doorbell registers 208 to point to the next, not-yet-requested entry in submission queue 201.

Back end 110 processes the received commands. When a command is completed, back end 110 informs command generator 220, which writes a completion queue entry into completion queue buffer 212 and informs host signaling unit 122 of this completion. Host signaling unit 122 enters information about the completed command into interrupt table 214 and interrupt generator 216 generates an interrupt for transmission to host system 102, informing host system 102 that a command is completed. Host system 102 obtains the completed command from storage device 104 and writes a completion queue entry into the appropriate completion queue 404, also updating the appropriate head register of the associated CQ doorbell register 210. Host system 102 processes the entries in completion queue 203. After processing one or more entries, host system 102 signals to front end 108 regarding the processed entries, with a doorbell, and updates the head register of the completion queue registers 410 to point to the next entry in the completion queue 203 to be processed.

Any of the resources described above may be shared between different virtual functions. For example, any of the doorbell registers, including submission queue registers 208 and completion queue registers 210, may be shared. The completion queue buffer 212, and the interrupt table 214 may also be shared between multiple virtual functions. These resources are considered "partitionable resources" because they consist of spatially separable resources that can physically be divided between different virtual functions. Any particular subset of any particular partitionable resource can be programmably assigned to any particular virtual function, via the associated virtual function mapping unit 206. Whenever a partitionable resource is accessed, a particular partition of the partitionable resource is identified, via an associated virtual function mapping unit 206, based on a virtual function number.

The queue arbitrator 218, command generator 220, and interrupt generator 216 are also shared resources, but are considered "shared processing resources," as opposed to partitionable resources. Shared processing resources can be temporally divided between virtual functions in a manner that is described in more detail with respect to FIG. 3.

Note that although specific resources within the storage device are described herein as being shared, any resource within SSD controller 105 may be shared. A mapping unit 206 may be provided for each such resource, in order to map virtual functions to associated portions of resources.

Figure 3:
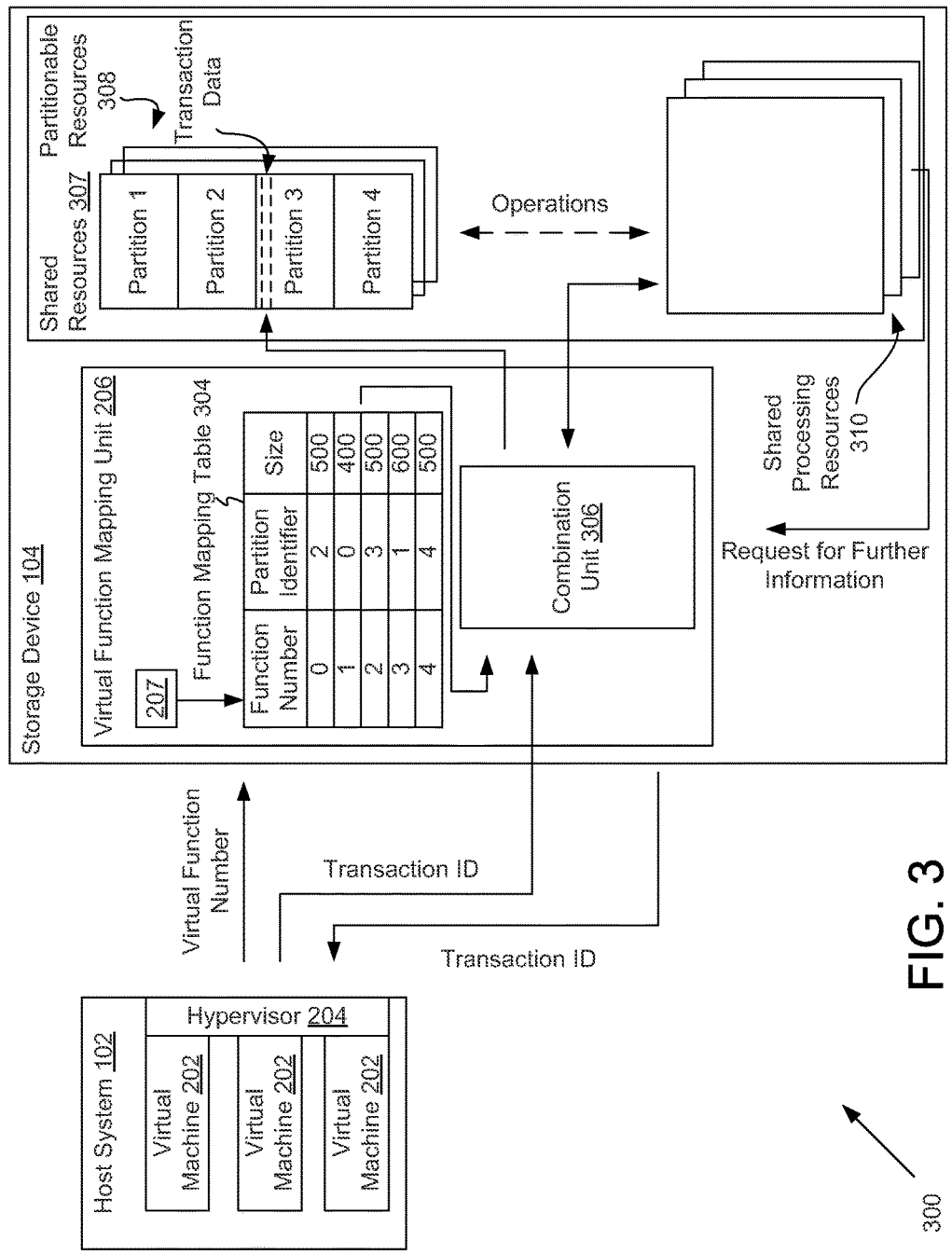
FIG. 3 is a schematic diagram of the storage device and host system of FIG. 2, illustrating details of a virtual function mapping unit for partitioning shared resources, according to an example.

FIG. 3 is a schematic diagram of the storage device 104 and host system 102 of FIG. 2, illustrating details of a virtual function mapping unit 206 for partitioning shared resources, according to an example. More specifically, host system 102 and storage device 104 are shown, and an example implementation of virtual function mapping unit 206 within storage device 104 is shown as well. The virtual function mapping unit 206 assists with partitioning shared resources 307, which include partitionable resources 308 and shared processing resources 310.

The virtual function mapping unit 206 includes a function mapping table 304 and a combination unit 306. The function mapping table 304 includes entries for each virtual function number. Each such entry correlates a particular virtual function to a partition of a particular partitionable resource 308 and also specifies the size of that partition. As stated above, host system 102 may transmit a command to storage device 104 to configure the manner in which portions of a particular shared resource 307 are allocated to different virtual functions by configuring a function mapping unit 206 associated with that shared resource 307. When storage device 104 receives such a command, storage device 104 directs that command to the appropriate virtual function mapping unit 206. The virtual function mapping unit 206 stores values specified by that command into IOV registers 207. These values specify which portions of shared resources 307 are associated with which virtual functions and may include values such as partition identifier, which identifies which partition is associated with a particular virtual function, size, which specifies the size of the partition, and other values. The function mapping table 304 references the values stored in the IOV registers 207 (or copies values stored in those IOV registers 207 into storage internal to the function mapping table 304) in order to respond to requests for access to partitionable resource 308 that may be received from various units within storage device 104. Any unit within storage device 104 that accesses a partitionable resource 308 may access virtual function mapping unit 206 to access a portion of the partitionable resource 308 associated with a given virtual function. The configurable nature of the function mapping table 304 allows host system 102 to variably assign different portions of partitionable resources 308 to different virtual functions.

For each command received from host system 102, in addition to receiving a virtual function number, virtual function mapping unit 206 also receives a transaction identifier. The transaction identifier is a unique number that specifies the transaction associated with the command. In one example, the transaction identifier may identify a particular queue (such as a submission queue 201 or a completion queue 203) within host system 102. The transaction identifier uniquely identifies a particular entry within a partitionable resource 308.

To access a partitionable resource 308 for the command, virtual function mapping unit 206 provides the virtual function number to a virtual function mapping table 304 associated with the partitionable resource 308 and receives the base address of the associated partition in response. Combination unit 306 receives the base address from the function mapping table 304 and also receives the transaction identifier and combines these values to produce an index for the partitionable resource 308. This index specifies the location in partitionable resource 308 that is associated with the provided virtual function identifier and transaction identifier. In one embodiment, combining the values involves adding the base address to the transaction ID (optionally multiplied by an entry size). Also, in one embodiment, virtual function mapping unit 206 identifies the base address for a particular partition by adding the size of each preceding partition. In another embodiment, base addresses are explicitly stored in virtual function mapping unit 206.

In some embodiments, before attempting to access a partitionable resource 308, storage device 104 checks the transaction identifier received from host system 102 against a partition size. This check prevents accessing data outside of a partition assigned to a particular virtual function and thus provides additional security as compared with not performing this check.

When a host system 102 programs the function mapping table 304, this alters the correlation between virtual functions and partition identifiers specified in the function mapping table 304 and may also alter the size corresponding to each function number. Thus, function mapping table 304 may programmably assign any amount of a particular partitionable resource 308 to any particular virtual function.

Note that the particular partitionable resource 308 illustrated in FIG. 3 may represent any of a number of different resources within storage device 104 that are "structurally separable." More specifically, partitionable resources 308 include resources such as queues, buffers, registers, and the like, that include physical chunks of memory that can be physically separated or partitioned.

Like partitionable resources 308, shared processing resources 310 are also sharable between virtual functions. More specifically, shared processing resources 310 constitute elements of storage device 104 that have the ability to process data. These elements may include processors, state machines, and other types of elements that can process data.

Shared processing resources 310 are shared in a timewise manner between different virtual functions. The schedule for usage of any particular shared processing resource 310 may be determined in any manner. In one example, a shared processing resource 310 is time-divided in a round-robin manner. Thus, the shared processing resource 310 would be assigned to process data for one virtual function, then for another virtual function, and so on.

Each shared processing resource 310 processes data from and is thus associated with a particular partitionable resource 308. Further, each shared processing resource 310 identifies a particular partition of an associated partitionable resource 308 to process based on which virtual function is currently set to be processed (i.e., based on the time-division schedule, such as "round-robin" mentioned above). When a shared processing resource 310 is set to process data for a first virtual function, the shared processing resource 310 provides the associated virtual function number to an associated function mapping table 304 to obtain a partition base address and accesses the associated partition of the associated partitionable resource 308. While advancing through the time-division schedule, a shared processing resource 310 may skip virtual functions that are not included in a function mapping table 304 associated with the associated partitionable resource 308 and/or may skip virtual functions that have a size of zero (and are thus unused). In some embodiments, virtual function mapping table 304 may store data that assigns a particular share of time to different virtual functions. For example, a first virtual function may be assigned 30% of the time, a second virtual function may be assigned 20% of the time, and so on. In such embodiments, shared processing resource 310 accesses these entries to obtain the specified time-division schedule. In some embodiments, virtual function mapping table 304 may also store a bit for each virtual function that identifies whether the virtual function is active or inactive. If the bit indicates that the virtual function is inactive, then shared processing resource 310 skips that virtual function.

The particular entry within an identified partition of partitionable resources 308 that is to be accessed by a shared processing resource 310 is dependent on the type of shared processing resource 310. For example, for a shared processing resource 310 that accesses a queue, the shared processing resource 310 may always access the head of that queue.

For any particular task performed by a shared processing resource 310, the shared processing resource 310 may need to request additional information from host system 102. To target the correct virtual machine 202, shared processing resource 310 requests a reverse translation from an associated virtual function mapping unit 206. More specifically, shared processing resource 310 transmits the partition base address and the address within that partition that is being accessed by the processing resource 310 to the virtual function mapping unit 206 associated with the partitionable resource 308 being accessed. Virtual function mapping unit 206 performs a reverse translation to obtain a transaction identifier and virtual function number and transmits a request for additional information with that transaction identifier and virtual function number to host system 102. Reverse mapping may be performed via a reverse mapping table. Values in a reverse mapping are programmed at the same time as values in function mapping table 304. Instead of mapping a function number to a partition identifier and size, reverse mapping table maps an address within a partitionable resource 308 to a virtual function number and transaction identifier.

If a timeout occurs, shared processing resource 310 "skips over" the current virtual function and advances to data corresponding to the next virtual function, within partitionable resources 308. A timeout occurs if processing resource 310 does not receive a response to such a request from a host system 102 after waiting for a threshold amount of time.

If multiple timeouts occur in succession for the same virtual function, shared processing resource 310 determines that the virtual function is "stuck." Consequently, shared processing resource 310 resets shared resources 307 associated with that virtual function. To reset such shared resources 307, storage device 104 erases (or marks for erasure) all entries within partitionable resources 308 that are associated with the virtual function. Further, storage device 104 causes each shared processing resource 310 to skip over tasks associated with that virtual function.

Figure 4:
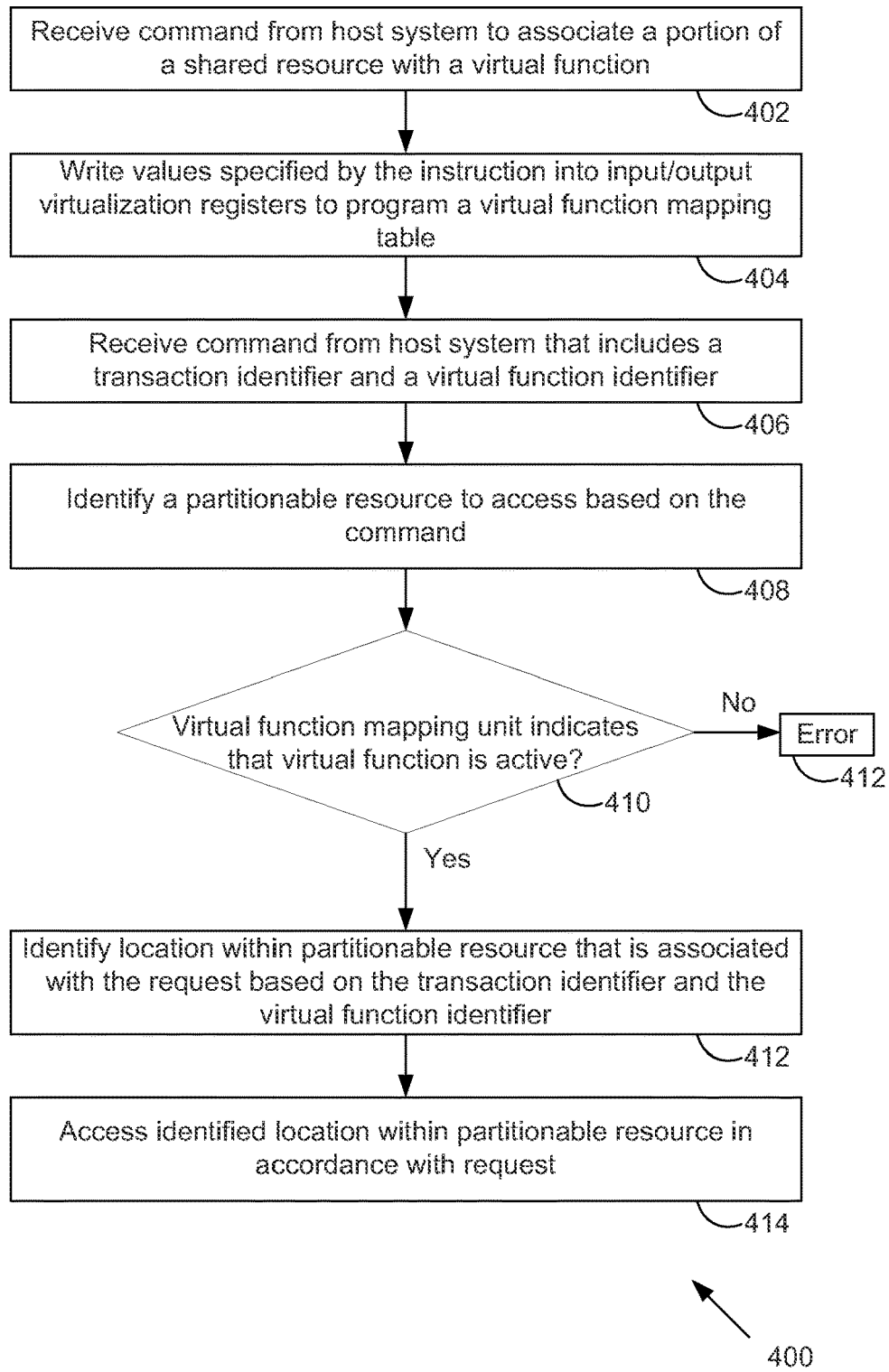
FIG. 4 is a flow diagram of method steps for accessing partitionable resources, according to an example.
Figure 5:
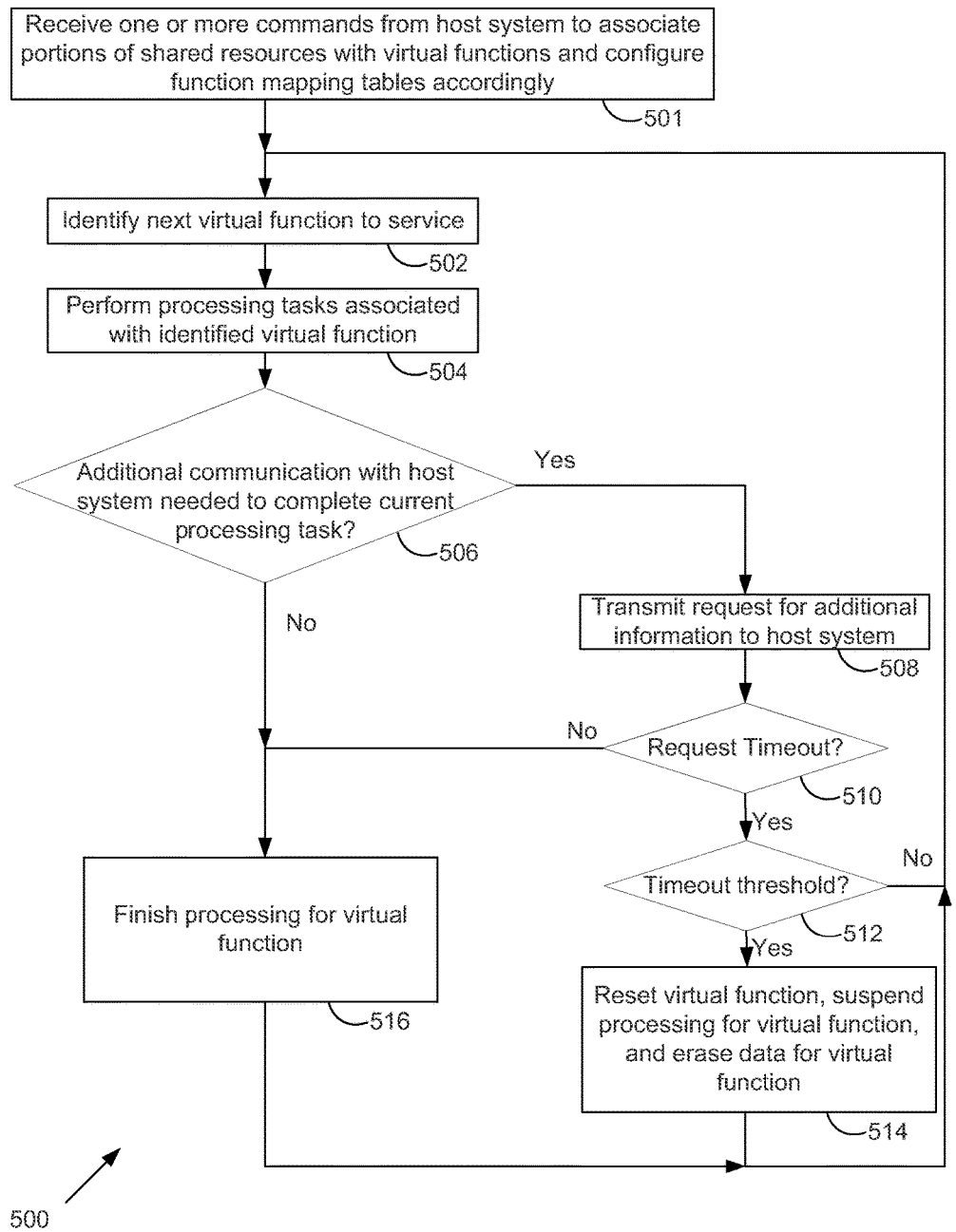
FIG. 5 is a flow diagram of method steps for sharing shared processing resources, according to an example.

FIGS. 4 and 5 illustrate methods for accessing shared resources of the storage device 104 in a flexible manner. FIG. 4 illustrates the manner in which storage device 104 accesses a virtual function mapping table 104 to access a particular portion of a partitionable resource 308. FIG. 5 illustrates the manner in which shared processing resources 310 divide processing time between multiple virtual functions.

FIG. 4 is a flow diagram of method steps for accessing partitionable resources 308, according to an example. Although described with respect to the system and related operations described above with respect to FIGS. 1-4, those of skill in the art will understand that any system performing the steps described herein, in technically feasible alternative orders, falls within the scope of this disclosure.

As shown, a method 400 begins at step 402, where storage device 104 receives a command from a host system 102 to associate a portion of a shared resource 307 with a virtual function. The command includes information that identifies a particular virtual function, one or more partitionable resources 308 to be configured, and data that specifies which portions of the partitionable resources 308 are to be associated with the virtual function. In some embodiments, the data also specifies information related to a time-sharing schedule. The command may alternatively specify that the particular virtual function is inactive. In response to receiving the command, at step 404, storage device 104 writes data into IOV registers 207 associated with the partitionable resource 308, in order to program a virtual function mapping table 304 within a virtual function mapping unit 206 associated with the partitionable resource 308.

At step 406, storage device 104 receives a command for access to storage device 104 from host system 102. The command includes a virtual function identifier and also a transaction identifier. At step 408, based on the command, storage device 104 identifies a particular partitionable resource 308 to access. At step 410, storage device 104 determines whether a virtual function mapping unit 206 indicates that the virtual function associated with the received virtual function identifier is active. If the virtual function is not active, then the method 400 proceeds to step 412, where an error occurs. If the virtual function is active, then the method 400 proceeds to step 412. At step 412, storage device 104 identifies a location within the partitionable resource 308 that is associated with the command based on the transaction identifier and the virtual function identifier received with the command. At step 414, storage device 104 accesses the identified location within the partitionable resource in accordance with the command.

FIG. 5 is a flow diagram of method steps for sharing shared processing resources 310, according to an example. Although described with respect to the system and related operations described above with respect to FIGS. 1-4, those of skill in the art will understand that any system performing the steps described herein, in technically feasible alternative orders, falls within the scope of this disclosure.

As shown, a method 500 begins at step 501, where storage device 104 receives a command from a host system 102 to associate a portion of a shared resource 307 with a virtual function. The command includes information that identifies a particular virtual function, one or more partitionable resources 308 to be configured, and data that specifies which portions of the partitionable resources 308 are to be associated with the virtual function. In some embodiments, the data also specifies information related to a time-sharing schedule. The command may alternatively specify that the particular virtual function is inactive. In response to receiving the command, at step 504, storage device 104 writes data into IOV registers 207 associated with the partitionable resource 308, in order to program a virtual function mapping table 304 within a virtual function mapping unit 206 associated with the partitionable resource 308. At step 502, a shared processing resource 310 identifies a next virtual function to service. Shared processing resource 310 identifies the next virtual function based on a time-division schedule, which, in one example, is a round-robin schedule, although other schedules are possible. Shared processing resource 310 may skip over virtual functions that are not enabled. Data indicating whether virtual functions are enabled or disabled may be stored in associated virtual function mapping units 206. At step 504, shared processing resource 310 performs processing tasks associated with the identified virtual function. The processing tasks to be performed may be defined by data stored within an associated partitionable resource 308, in which case shared processing resource 310 performs a task associated with the identified virtual function by examining data stored in a partition of the partitionable resource 308 that is associated with that virtual function. In one example, the partitionable resource 308 is a set of queues. In this example, shared processing resource 310 determines which portion of the set of queues is assigned to the virtual function, identifies the head of that queue, obtains the data from that head, and processes that data. At step 506, shared processing resource 310 determines whether additional communication with host system 102 is needed in order to complete the processing task currently being processed. Additional information may include completion queue head information, or additional physical region page (PRP) or scatter gather list (SGL) entries. If additional information is needed, then the method 500 proceeds to step 508 and if additional information is not needed, then the method proceeds to step 516.

At step 508, shared processing resource 310 transmits a request for additional information to host system 102. To transmit this request, shared processing resource 310 may translate an internal identifier associated with the virtual function into a virtual function and transaction identifier in order to identify to host system 102 the particular transaction (including the associated virtual machine 202) is to service the request. At step 510, shared processing resource 310 determines if the request for additional information times out. The request may time out when shared processing resource 310 does not receive the response in a pre-defined period of time. If the request does not time out, then shared processing resource 310 receives data from host system 102 and the method 500 proceeds to step 516. If the request does time out, then the method proceeds to step 512. At step 512, shared processing resource 310 determines whether a timeout has occurred a threshold number of times. If a timeout has occurred a threshold number of times, then the method proceeds to step 514, where shared processing resource 310 triggers the virtual function to be reset, suspends processing, and erases data stored in partitionable resources 308 that are associated with the virtual function. After step 514, the method proceeds to step 502. If a timeout has not occurred a threshold number of times, then the method proceeds to step 502. At step 516, shared processing resource 310 finishes processing for the virtual function, and after step 516, the method returns to step 502.

In sum, embodiments described herein provide techniques for sharing resources between multiple virtual functions of a host system. According to the techniques, a storage device includes resources that are shared between virtual functions. The storage device receives commands that include a virtual function identifier and accesses a virtual function mapping unit to determine a portion of shared resources associated with that virtual function. The storage device accesses the identified portion of the shared resources in accordance with the received commands. For each type of shared resource, a user may modify which portions of the shared resource are associated with the various virtual functions. Advantageously, configuring the manner in which shared resources are divided between virtual functions allows the resources of a particular storage device to be used more efficiently than if those resources were divided between virtual functions in a fixed manner. If storage device were configured in a fixed manner, then host system may, in some situations, fail to use some of the resources of the storage device. These unused resources would therefore be wasted, which is undesirable.

Note that although the foregoing description describes virtual functions as being assigned to different virtual machines 202, different virtual functions may be addressed by a computer system that does not execute virtual machines 202. Thus the techniques described herein do not require a host system 102 that executes virtual machines 202. Instead, these techniques may be used by any computer system that uses virtual functions as a parameter when communicating with storage device 104.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

We claim:

1. A data storage device comprising:
a non-volatile semiconductor memory device; and
a controller for the non-volatile semiconductor memory device, the controller including a virtual function mapping unit that maintains a function mapping table which stores values that are programmable by a host system to which the data storage device is connected and associate virtual functions with portions of shared resources of the controller, the controller configured to:
receive a command from the host system to read data from or write data in the non-volatile semiconductor memory device, the command including a virtual function identifier and a transaction identifier;
identify, via the virtual function mapping unit, a portion of a shared resource of the controller based on the virtual function identifier and the transaction identifier, wherein the portion of the shared resource comprises a time-slice of a shared processing resource; and
access the identified portion of the shared resource based on the received command.

2. The data storage device of claim 1, wherein:
the controller is further configured to modify the programmable values of the function mapping table in response to a command from the host system to change the manner in which the shared resource is divided between virtual functions.

3. The data storage device of claim 1, wherein:
the portion of the shared resource comprises a transaction data entry within a partition of a partitionable resource.

4. The data storage device of claim 3, wherein:
the virtual function mapping unit is configured to identify the portion of the shared resource by:
providing the virtual function identifier to the function mapping table to obtain a partition identifier associated with a partition of the partitionable resource,
determining a base address within the partitionable resource, and
determining an address of the transaction data entry by adding the transaction identifier to the base address.

5. The data storage device of claim 1, wherein:
the controller is further configured to switch to processing data associated with a different virtual function than the virtual function associated with the virtual function identifier after determining that a timeout has occurred.

6. The data storage device of claim 5, wherein:
the controller is further configured to erase data associated with the virtual function associated with the virtual function identifier upon determining that a timeout has occurred a threshold number of times.

7. The data storage device of claim 1, wherein the host system has multiple virtual machines running therein and the virtual function identifier is associated with only a single virtual machine executing in the host system.

8. The data storage device of claim 1, wherein the controller includes registers, queues, and buffers and the shared resources include said registers, said queues, and said buffers.

9. A method comprising:
receiving a command from a host system to read data from or write data in a non-volatile semiconductor memory device, the command including a virtual function identifier and a transaction identifier;

identifying, via a virtual function mapping unit that is included within a controller for the non-volatile semiconductor memory device and that maintains a function mapping table which stores values that are programmable by the host system and associate virtual functions with portions of shared resources of the controller, a portion of a shared resource of the controller based on the virtual function identifier and the transaction identifier, wherein the portion of the shared resource comprises a time-slice of a shared processing resource; and accessing the identified portion of the shared resource based on the received command.

10. The method of claim 9, further comprising:

modifying the programmable values of the function mapping table in response to a command from the host system to change the manner in which the shared resource is divided between virtual functions.

11. The method of claim 9, wherein:

the portion of the shared resource comprises a transaction data entry within a partition of a partitionable resource.

12. The method of claim 11, further comprising:

identifying, via the virtual function mapping unit, the portion of the shared resource, by:

providing the virtual function identifier to the function mapping table to obtain a partition identifier associated with a partition of the partitionable resource, determining a base address within the partitionable resource, and determining an address of the transaction data entry by adding the transaction identifier to the base address.

13. The method of claim 9, further comprising:

switching to processing data associated with a different virtual function than the virtual function associated with the virtual function identifier after determining that a timeout has occurred.

14. The method of claim 13, further comprising:

erasing data associated with the virtual function associated with the virtual function identifier upon determining that a timeout has occurred a threshold number of times.

15. The method of claim 9, wherein the host system has multiple virtual machines running therein and the virtual function identifier is associated with only a single virtual machine executing in the host system.

16. The method of claim 9, wherein the controller includes registers, queues, and buffers and the shared resources include said registers, said queues, and said buffers.

17. A non-transitory computer-readable medium storing instructions that, when executed by a processor, cause the processor to perform a method comprising:

receiving a command from a host system to read data from or write data in a non-volatile semiconductor memory device, the command including a virtual function identifier and a transaction identifier;

identifying, via a virtual function mapping unit that is included within a controller for the non-volatile semiconductor memory device and that maintains a function mapping table which stores values that are programmable by the host system and associate virtual functions with portions of shared resources of the controller, a portion of a shared resource of the controller based on the virtual function identifier and the transaction identifier, wherein the portion of the shared resource comprises a time-slice of a shared processing resource; and accessing the identified portion of the shared resource based on the received command.

18. The non-transitory computer-readable medium of claim 17, wherein the method further comprising:

modifying the programmable values of the function mapping table in response to a command from the host system to change the manner in which the shared resource is divided between virtual functions.

19. The non-transitory computer-readable medium of claim 17, wherein:

the portion of the shared resource comprises a transaction data entry within a partition of a partitionable resource.

20. The non-transitory computer-readable medium of claim 19, wherein the method further comprises:

identifying, via the virtual function mapping unit, the portion of the shared resource, by:

providing the virtual function identifier to the function mapping table to obtain a partition identifier associated with a partition of the partitionable resource, determining a base address within the partitionable resource, and determining an address of the transaction data entry by adding the transaction identifier to the base address.

* * * * *